J. H. SHERARD.
DRAFT ATTACHMENT FOR HARROWS.
APPLICATION FILED MAY 16, 1910.
1,011,891.
Patented Dec. 12, 1911.
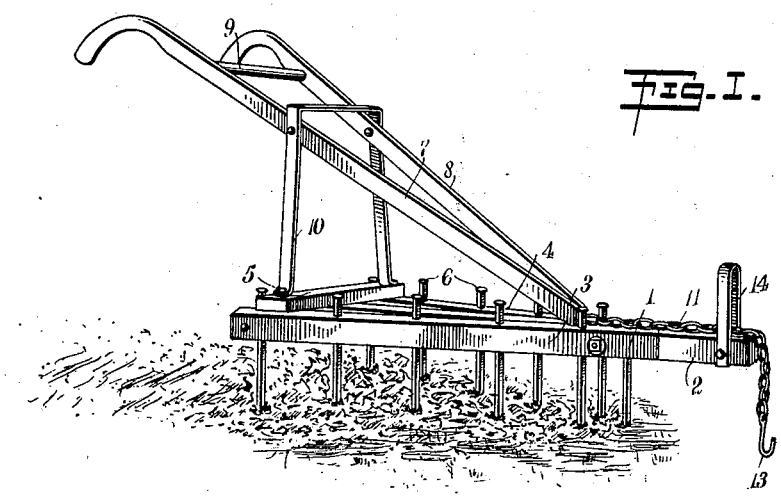
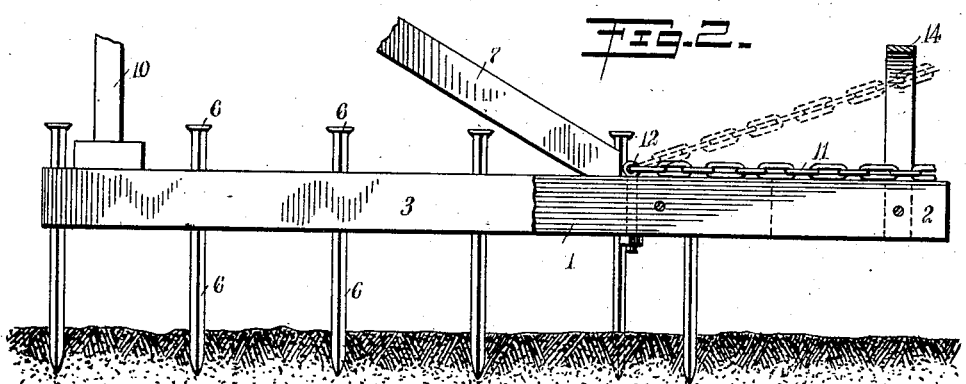
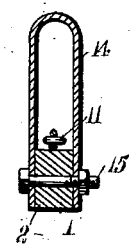
WITNESSES:
G. Robert Thomas
N. Whiting
INVENTOR
John H. Sherard
BY Munn Co.
ATTORNEYS

UNITED STATES PATENT OFFICE.

JOHN H. SHERARD, OF SHERARD, MISSISSIPPI.

DRAFT ATTACHMENT FOR HARROWS.

1,011,891.     Specification of Letters Patent.     Patented Dec. 12, 1911.

Original application filed April 14, 1909, Serial No. 489,777. Divided and this application filed May 16, 1910. Serial No. 561,548.

*To all whom it may concern:*

Be it known that I, JOHN H. SHERARD, a citizen of the United States, and a resident of Sherard, in the county of Coahoma and State of Mississippi, have invented a new and Improved Draft Attachment for Harrows, of which the following is a full, clear, and exact description.

The invention relates to an improvement in harrows, and particularly relates to the draft attachment therefor, and is, further, a division of my application Serial No. 489,777, filed April 14, 1909.

An object of this invention is to provide a device which will be simple in construction, inexpensive to manufacture, strong, durable, and positive in its operation.

A further object of this invention is to provide a draft attachment for harrows, whereby the pull of either a tall or short draft animal will maintain the teeth of the harrow evenly in the ground without causing it to jump in and out.

These and further objects, together with the construction and combination of parts, will be more fully described hereinafter and particularly set forth in the claim.

Reference is to be had to the accompanying drawings forming a part of this specification, in which similar characters of reference indicate corresponding parts in all the views, and in which—

Figure 1 is a perspective view; Fig. 2 is an enlarged side view in elevation, partly in section; and Fig. 3 is an enlarged vertical section through the guiding or retaining bracket.

Referring more particularly to the separate parts of the device, 1 indicates a frame, which may be of any suitable form, but preferably consists of a central longitudinal beam 2, having side beams 3 and 4 secured thereto in any well known manner and extending therefrom at equal angles in a diverging manner, from the front toward the rear. The three beams are secured in spaced relation by a transverse beam 5 adjacent their rear ends.

Secured to the frame 1 in any well known manner, preferably adjustably, so as to vary the depth which they may be inserted in the ground, there are provided a plurality of teeth 6, which may be of any suitable form.

For the purpose of directing the movement of the harrow, there are provided handles 7 and 8, spaced apart at their rear ends by means of a bar 9, and converging downwardly toward their front ends, where they are joined and attached in any suitable manner to the frame 1. These handles 7 and 8 are supported also adjacent their rear ends by an auxiliary frame 10, in the form of a U-shaped member supported on the frame 1.

For the purpose of drawing the harrow over the ground, there is provided a flexible draft connection 11, which, instead of being secured to the very front end of the frame, is preferably secured some distance back from the front end, adjacent the point of junction of the handle bars 7 and 8 with the frame 1. The means of securing the flexible draft connection 11 may be of any suitable character, such as an eyebolt 12. The flexible draft connection 11, may itself be of any suitable character, such as a link chain, and is preferably provided with a hook 13, whereby it may be secured to the trees drawn by the draft animals.

For the purpose of guiding the draft connection 11 and transmitting its motion to the frame 1 and the harrow, there is provided a U-shaped bracket 14, which is in the form of two legs engaging on opposite sides of the beam 2 and extending vertically upward to a point where they are joined together. The legs are secured in any well known manner to the sides of the central beam 2, as by means of a bolt 15 passing through alined openings. This arrangement of the draft attachment is important, in that it permits the teeth 6 to dig evenly into the ground, whether the harrow is drawn by tall or short animals, and does not jerk the forward teeth out of the ground at any time, the chain being permitted to swing from the full-line position illustrated in Fig. 2 to the dotted-line position.

If it is desired to swing the harrow to one side or the other, it is merely necessary to guide the animals in that direction, and the side draft will cause the bracket 14 to swing the forward end of the harrow in the desired direction.

While I have shown one embodiment of my invention, I do not wish to be limited to the specific details thereof, but desire to be protected in various changes, modifications and alterations which I may make within the scope of the appended claim.

Having thus described my invention, I claim as new and desire to secure by Letters Patent:—

The combination with a frame, comprising a central beam and a pair of beams diverging from the sides of said central beam, of teeth extending downwardly from said frame, said frame projecting forwardly a considerable distance from the foremost of said teeth so as to have a portion of said frame beneath the same free from teeth, handles for directing the movement of said frame, converging downwardly to a point of juncture with said frame, located adjacent the foremost of said teeth, a flexible chain secured to said frame substantially at the point of junction of said handles with said frame, and an inverted elongated U-shaped bracket secured to said central beam and having legs extending on opposite sides of said chain, so that said chain passes freely within said U-shaped bracket, so as to have a limited movement relative thereto, and yet whereby the movements of said chain in a transverse direction are transmitted to said frame to turn the same.

In testimony whereof I have signed my name to this specification in the presence of two subscribing witnesses.

JOHN H. SHERARD.

Witnesses:
ROBERT S. ARRINGTON,
HARRY F. BOWEN.

Copies of this patent may be obtained for five cents each, by addressing the "Commissioner of Patents, Washington, D. C."